(12) United States Patent
Lee et al.

(10) Patent No.: US 11,575,183 B2
(45) Date of Patent: Feb. 7, 2023

(54) SECONDARY BATTERY

(71) Applicant: Samsung SDI Co., Ltd., Yongin-si (KR)

(72) Inventors: Hyun Soo Lee, Yongin-si (KR); Sang Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 38 days.

(21) Appl. No.: 16/325,912

(22) PCT Filed: Jun. 19, 2017

(86) PCT No.: PCT/KR2017/006392
§ 371 (c)(1),
(2) Date: Feb. 15, 2019

(87) PCT Pub. No.: WO2018/043880
PCT Pub. Date: Mar. 8, 2018

(65) Prior Publication Data
US 2019/0214625 A1    Jul. 11, 2019

(30) Foreign Application Priority Data
Aug. 30, 2016 (KR) ........................ 10-2016-0110490

(51) Int. Cl.
*H01M 50/543* (2021.01)
*H01M 10/052* (2010.01)
(Continued)

(52) U.S. Cl.
CPC ....... *H01M 50/543* (2021.01); *H01M 10/052* (2013.01); *H01M 50/147* (2021.01);
(Continued)

(58) Field of Classification Search
CPC ......... H01M 2/04–0495; H01M 4/621; H01M 4/04; H01M 4/02–139;
(Continued)

(56) References Cited

U.S. PATENT DOCUMENTS

| 5,599,465 A | 2/1997 | Park et al. |
| 6,509,115 B2 | 1/2003 | Kim et al. |

(Continued)

FOREIGN PATENT DOCUMENTS

| CN | 1292155 A | 4/2001 |
| CN | 101979324 A | 2/2011 |

(Continued)

OTHER PUBLICATIONS

EPO Extended Search Report dated Dec. 12, 2019, for corresponding European Patent Application No. 17846805.4 (6 pages).

(Continued)

*Primary Examiner* — Cynthia H Kelly
*Assistant Examiner* — Niara Trant
(74) *Attorney, Agent, or Firm* — Lewis Roca Rothgerber Christie LLP

(57) ABSTRACT

The present invention comprises: an electrode assembly in which a separator is interposed in between a first electrode and a second electrode; a case for accommodating the electrode assembly; a cap plate for sealing an opening at the upper end of the case, wherein a first terminal electrically connected to the first electrode of the electrode assembly is integrally formed with the cap plate; at least one stepped portion protruding upward from the cap plate; and a plate terminal arranged on the exterior of the cap plate, wherein the plate terminal is provided with, on a bottom part thereof, a recessed groove having a size and a depth corresponding to the size and the height of the stepped portion. A secondary battery, according to one embodiment of the present inven- (Continued)

tion, is provided with the protruding stepped portion on the cap plate so that the terminal can be fixed so as to prevent shifting to the left or to the right.

9 Claims, 6 Drawing Sheets

(51) Int. Cl.
*H01M 50/147* (2021.01)
*H01M 50/172* (2021.01)
*H01M 50/15* (2021.01)
*H01M 50/55* (2021.01)
*H01M 50/545* (2021.01)

(52) U.S. Cl.
CPC ......... *H01M 50/15* (2021.01); *H01M 50/172* (2021.01); *H01M 50/55* (2021.01); *H01M 50/545* (2021.01); *Y02E 60/10* (2013.01); *Y02T 10/70* (2013.01)

(58) Field of Classification Search
CPC . H01M 50/50–543; H01M 50/10–172; H01M 50/147; H01M 10/00–052
See application file for complete search history.

(56) References Cited

U.S. PATENT DOCUMENTS

| | | | |
|---|---|---|---|
| 6,630,270 B1 | 10/2003 | Kim et al. | |
| 8,367,242 B2 | 2/2013 | Byun et al. | |
| 9,023,498 B2 | 5/2015 | Kim et al. | |
| 9,172,079 B2 | 10/2015 | Han et al. | |
| 9,293,756 B2 | 3/2016 | Kim | |
| 9,570,731 B2 | 2/2017 | Seong et al. | |
| 10,297,810 B2 | 5/2019 | Hwang et al. | |
| 10,396,338 B2 | 8/2019 | Hwang et al. | |
| 10,411,241 B2 | 9/2019 | Kang | |
| 2001/0004505 A1 | 6/2001 | Kim et al. | |
| 2005/0214640 A1 | 9/2005 | Kim | |
| 2006/0216592 A1* | 9/2006 | Chun | H01M 10/0587 429/175 |
| 2012/0021277 A1 | 1/2012 | Byun et al. | |
| 2012/0058390 A1 | 3/2012 | Obayashi et al. | |
| 2012/0070705 A1 | 3/2012 | Kim | |
| 2012/0148908 A1 | 6/2012 | Ito | |
| 2013/0011703 A1 | 1/2013 | Kim et al. | |
| 2013/0196179 A1 | 8/2013 | Han et al. | |
| 2014/0315054 A1 | 10/2014 | Han | |
| 2015/0024260 A1* | 1/2015 | Kwak | H01M 2/0217 429/178 |
| 2015/0171407 A1 | 6/2015 | Seong et al. | |
| 2015/0243940 A1 | 8/2015 | Kang | |
| 2015/0243941 A1 | 8/2015 | Kang | |
| 2016/0049632 A1 | 2/2016 | Hwang et al. | |
| 2016/0049633 A1 | 2/2016 | Kang | |
| 2016/0049634 A1 | 2/2016 | Hwang et al. | |
| 2016/0141588 A1 | 5/2016 | Kim et al. | |
| 2016/0248072 A1 | 8/2016 | Jang et al. | |

FOREIGN PATENT DOCUMENTS

| | | | |
|---|---|---|---|
| CN | 102386368 A | 3/2012 | |
| CN | 102544423 A | 7/2012 | |
| CN | 202762826 U | 3/2013 | |
| CN | 104300171 A | 1/2015 | |
| CN | 104716277 A | 6/2015 | |
| CN | 104882571 A | 9/2015 | |
| CN | 104882572 A | 9/2015 | |
| CN | 105609667 A | 5/2016 | |
| EP | 0655789 A1 | 5/1995 | |
| EP | 2463937 A2 * | 6/2012 | ............. H01M 2/06 |
| EP | 2463937 A2 | 6/2012 | |
| EP | 2988349 A2 | 2/2016 | |
| EP | 3024064 A1 | 5/2016 | |
| EP | 2988349 A3 | 6/2016 | |
| JP | S57-76365 U | 5/1982 | |
| JP | 2001196047 A | 7/2001 | |
| JP | 2004-186060 A | 7/2004 | |
| KR | 10-2010-0081508 A | 7/2010 | |
| KR | 10-1084056 B1 | 11/2011 | |
| KR | 10-2012-0029979 A | 3/2012 | |
| KR | 10-2013-0006280 A | 1/2013 | |
| KR | 10-2013-0089134 A | 8/2013 | |
| KR | 10-2014-0125657 A | 10/2014 | |
| KR | 10-2016-0060222 A | 5/2016 | |

OTHER PUBLICATIONS

International Search Report for corresponding International Application No. PCT/KR2017/006392, dated Sep. 12, 2017, 5pp.
Chinese Office action for Application No. 201780051302.3, dated Mar. 11, 2021, 8 pages.
Chinese Office action for Application No. 201780051302.3, dated Aug. 13, 2021, 15 pages.

* cited by examiner

|  | 1 Step (Height:3.7mm) | 1 Step (Height:3.0mm) | 2 Step (Height:3.7mm) |
|---|---|---|---|
| Volume before forming | 693 mm3 | 677 mm3 | 764 mm3 |
| Volume after forming | 696 mm3 | 641 mm3 | 736 mm3 |
| Volume ratio | 0% | 5% | 4% |
| Formability (Min. 3%) | X | 0 | 0 |

SECONDARY BATTERY

CROSS-REFERENCE TO RELATED APPLICATION(S)

This application is a National Phase Patent Application of International Patent Application Number PCT/KR2017/006392, filed on Jun. 19, 2017, which claims priority of Korean Patent Application No. 10-2016-0110490, filed Aug. 30, 2016. The entire contents of both of which are incorporated herein by reference.

TECHNICAL FIELD

The present invention relates to a secondary battery, and more particularly, to a secondary battery, in which a plate terminal part of a cap plate can be formed to have a desired height.

BACKGROUND ART

In general, unlike a primary battery that cannot be charged, a secondary battery can be recharged. A low-capacity secondary battery comprised of one single cell is used as the power source for various portable small-sized electronic devices, such as cellular phones or camcorders. A high-capacity secondary battery in which several tens of cells are connected in a battery pack is used as power sources for motor drives, such as those in electric bicycles, electric scooters, hybrid vehicles or electric vehicles.

The secondary battery is manufactured in various shapes, and representative shapes include a prismatic shape, a cylindrical shape, and a pouch shape. The secondary battery is configured such that an electrode assembly is housed in a case with a separator and a cap plate is coupled to the case. In addition, electrode tabs and positive and negative electrode terminals are connected to the electrode assembly and are exposed and protruded to the outside through the cap plate.

Technical Problems to be Solved

The present invention provides a secondary battery configured such that a height of a plate terminal connected to a cap plate can be increased to a desired height level.

Technical Solutions

In accordance with an embodiment of the present invention, there is provided a secondary battery including: an electrode assembly in which a separator is interposed in between a first electrode and a second electrode; a case for accommodating the electrode assembly; a cap plate for sealing an opening at the upper end of the case, wherein a first terminal electrically connected to the first electrode of the electrode assembly is integrally formed with the cap plate; and at least one stepped portion protruding upward from the cap plate.

In an aspect of the present invention, the secondary battery may further include a plate terminal arranged on the exterior of the cap plate, wherein the plate terminal is provided with, on a bottom part thereof, a recessed groove having a size and a depth corresponding to the size and the depth of the stepped portion.

Preferably, the cap plate may include protrusion parts for fixing the plate terminal upwardly protruding to both sides of the stepped portion.

In another aspect of the present invention, the stepped portion may include one or more steps and may integrally form the plate terminal with the cap plate. Here, the stepped portion may have a stepped shape in which its widths gradually decrease upward away from a surface of the cap plate. A side face of the stepped portion has a stepped shape by connecting multiple vertical parts and multiple horizontal parts.

Preferably, the vertical parts are inclined toward the center of the stepped portion in a direction perpendicular to a plane of the cap plate.

Advantageous Effects

As described above, in the secondary battery according to an embodiment of the present invention, the stepped portion protruding on the cap plate can fix the plate terminal so as to prevent the plate terminal from shifting to the left or to the right.

In addition, in the secondary battery according to an embodiment of the present invention, since the stepped portion of the cap plate fixes the plate terminal, the plate terminal can be formed to have a greater height than the conventional plate terminal.

In addition, in the secondary battery according to another embodiment of the present invention, some regions of the cap plate are formed as protruding stepped portions through multiple rolling steps, thereby integrally forming the plate terminal with the cap plate.

In addition, in the secondary battery according to another embodiment of the present invention, the plate terminal integrally formed with the cap plate can be formed to have a greater height than the conventional plate terminal through multiple stepped portions having a stepped shape formed on a surface of the cap plate.

In addition, in the secondary battery according to another embodiment of the present invention, it is possible to achieve a maximum height that enables a forming process using a mold with a limited volume in a single unit terminal forming process.

BEST MODE FOR CARRYING OUT THE INVENTION

Figure 1:
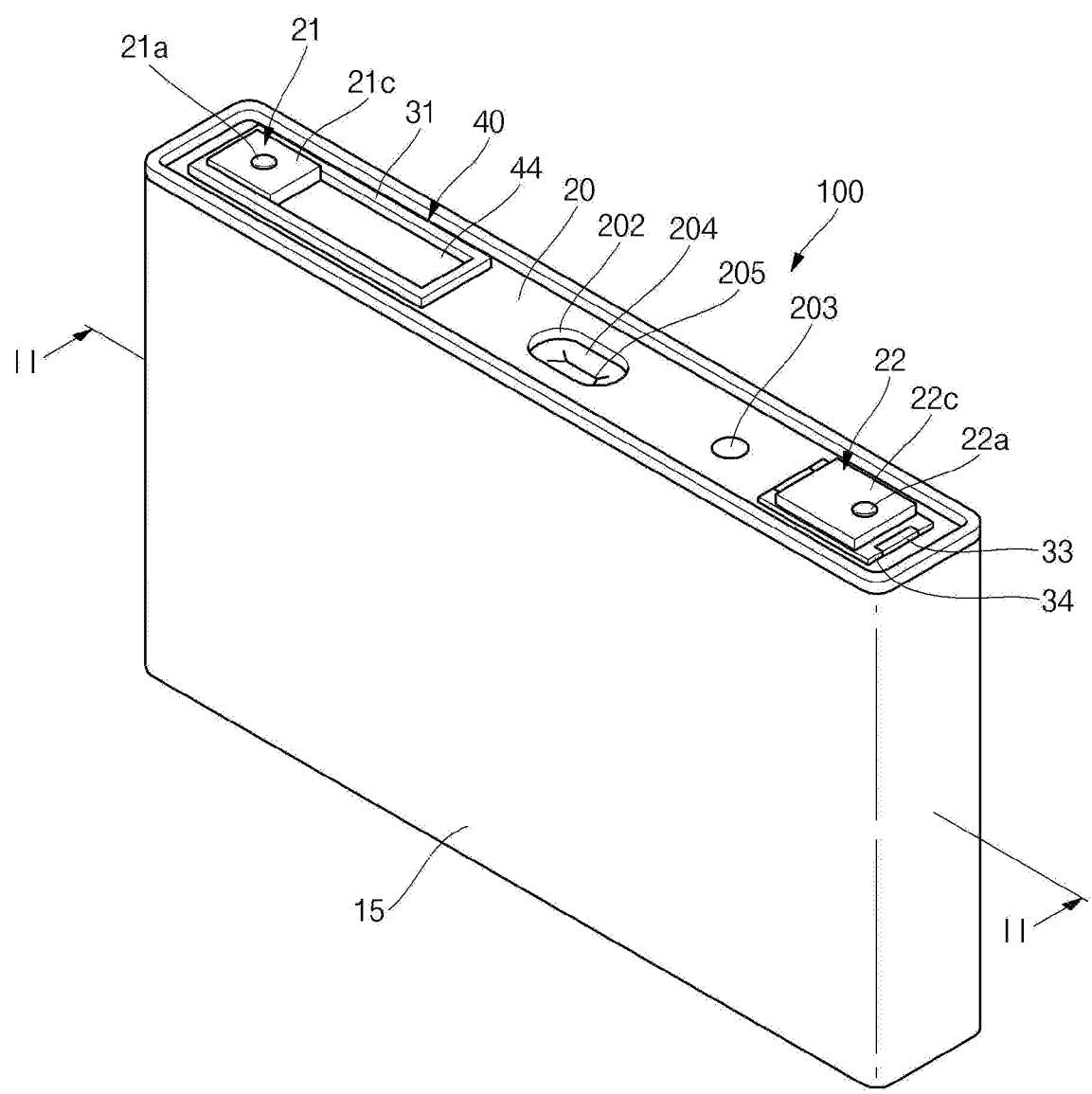
FIG. 1 is a perspective view of a secondary battery according to an embodiment of the present invention.

Hereinafter, exemplary embodiments of the present invention will be described in detail. Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Hereinafter, a preferred embodiment of the present invention will be described in detail with reference to accompanying drawings. FIG. 1 is a perspective view of a secondary battery according to an embodiment of the present invention and FIG. 2 is a cross-sectional view taken along the line II-II of FIG. 1.

Figure 2:
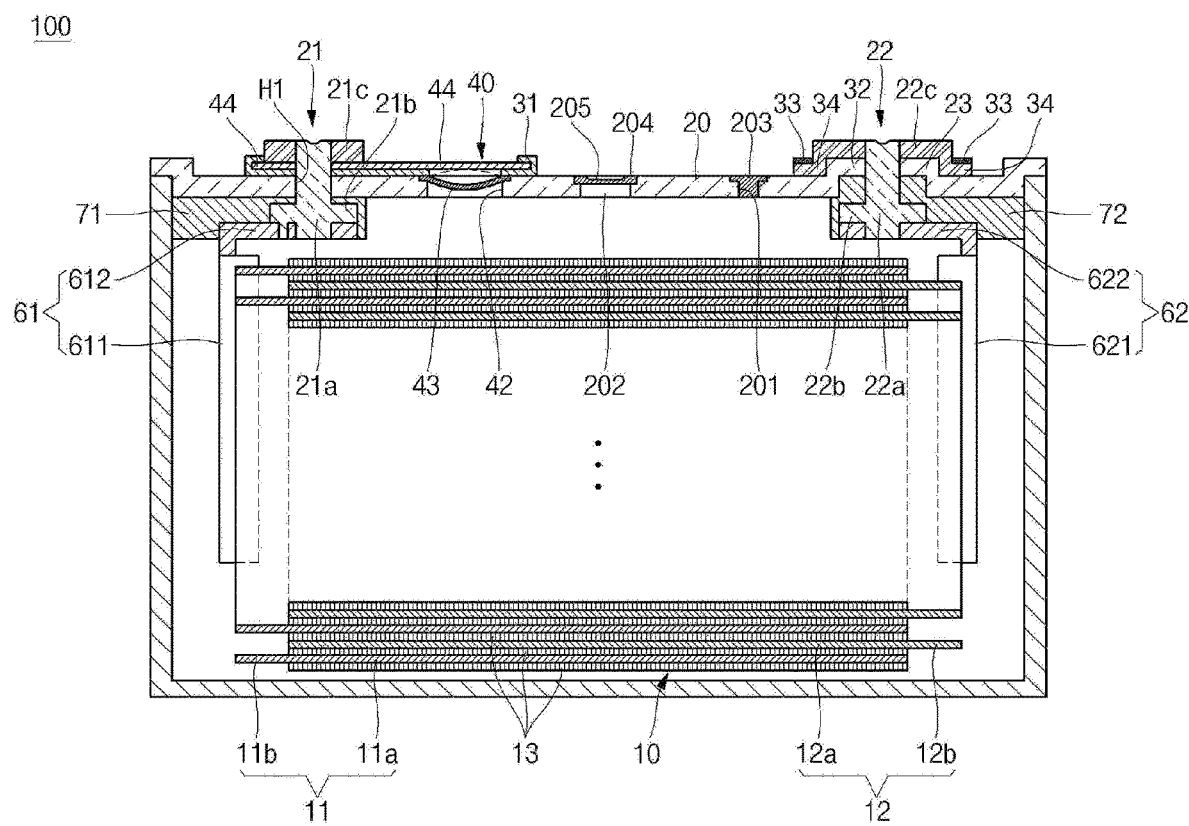
FIG. 2 is a cross-sectional view taken along the line II-II of FIG. 1.

Referring to FIGS. 1 and 2, the secondary battery 100 according to an embodiment of the present invention includes an electrode assembly 10 performing charging and discharging operations, a case 15 for accommodating the electrode assembly 10, a cap plate 20 for sealing an opening of the case 15, a negative electrode terminal 21 and a positive electrode terminal 22 installed in terminal holes H1 and H2 of the cap plate 20 to be connected to the electrode assembly 10, and an external short-circuit portion 40 for electrically disconnecting/connecting the cap plate 20 and the negative electrode terminal 21 from/to each other. The cap plate 20 is electrically connected to the positive electrode terminal 22.

The electrode assembly 10 is formed by installing a negative electrode 11 and a positive electrode 12 on both surfaces of a separator 13 as an insulator and winding the negative electrode 11, the separator 13 and the positive electrode 12 in a jelly-roll configuration.

The negative electrode 11 and the positive electrode 12 include coating portions 11a and 12a each having an active material coated on a current collector made of a metal plate, and non-coating portions 11b and 12b each formed of an exposed current collector having no active material coated on the current collector, respectively.

The non-coating portion 11b of the negative electrode 11 is formed at one end of the negative electrode 11 along the wound negative electrode 11. Therefore, the non-coating portions 11b and 12b of the negative electrode 11 and the positive electrode 12 are disposed at opposite ends of the electrode assembly 10, respectively.

The case 15 is shaped of a substantially rectangular parallelepiped to establish an inner space for accommodating the electrode assembly 10 and an electrolyte solution, and an opening is formed on one surface of the rectangular parallelepiped connecting the inner space to the outside. The opening allows the electrode assembly 10 to be inserted into the case 15.

The cap plate 20 is formed of a thin plate to be welded to the opening of the case 15, thereby sealing the case 15. The cap plate 20 further includes an electrolyte injection hole 201, a vent hole 202, and a short-circuit hole 42.

The electrolyte injection hole 201 allow the electrolyte solution to be injected into the case 15 after the cap plate 20 is coupled to the case 15 and then welded. After the electrolyte solution is injected, the electrolyte injection hole 201 is sealed by a plug 203.

The vent hole 202 is sealed by a vent plate 204 welded to discharge the internal pressure of the secondary battery 100. When the internal pressure of the secondary battery 100 reaches a preset pressure, the vent plate 204 is cut to open the vent hole 202. A notch 205 is formed to cause the vent plate 204 to be cut.

Meanwhile, the negative and positive electrode terminals 21 and 22 are installed to extend through the cap plate 20 and are then electrically connected to the electrode assembly 10. That is to say, the negative electrode terminal 21 is electrically connected to the negative electrode 11 of the electrode assembly 10, and the positive electrode terminal 22 is electrically connected to the positive electrode 12 of the electrode assembly 10. Therefore, the electrode assembly 10 is drawn to the outside of the case 15 through the negative electrode terminal 21 and the positive electrode terminal 22.

The negative and positive electrode terminals 21 and 22 include rivet terminals 21a and 22a installed in the terminal holes H1 and H2 of the cap plate 20, flanges 21b and 22b extending inside the rivet terminals 21a and 22a to be integrally formed with the rivet terminals 21a and 22a, and plate terminals 21c and 22c arranged on the exterior of the cap plate 20 to be connected to the rivet terminals 21a and 22a by riveting or welding, respectively.

Negative and positive electrode gaskets are inserted into portions between the rivet terminals 21a and 22a of the negative and positive electrode terminals 21 and 22 and inner surfaces of the terminal holes H1 and H2 of the cap plate 20 to seal gaps between the rivet terminals 21a and 22a of the negative and positive electrode terminals 21 and 22 and the cap plate 20, respectively.

Negative and positive electrode lead tabs 61 and 62 are electrically connected to the non-coating portions 11b and 12b of the negative and positive electrodes 11 and 12 of the electrode assembly 10, respectively. For example, the negative and positive electrode lead tabs 61 and 62 include bent collector parts 611 and 621 and connector parts 612 and 622, respectively. The collector parts 611 and 621 are welded to the non-coating portions 11b and 12b of the electrode assembly 10, and the connector parts 612 and 622 are connected to the rivet terminals 21a and 22a, respectively.

For example, the connector parts 612 and 622 of the negative and positive electrode lead tabs 61 and 62 are coupled to bottom ends of the rivet terminals 21a and 22a, followed by caulking, thereby connecting the connector parts 612 and 622 of the negative and positive electrode lead tabs 61 and 62 to the bottom ends of the rivet terminals 21a and 22a in conductive structures while the connector parts 612 and 622 of the negative and positive electrode lead tabs 61 and 62 are supported on the flanges 21b and 22b, respectively.

Internal insulators 71 and 72 are installed between each of the connector parts 612 and 622 of the negative and positive electrode lead tabs 61 and 62 and the cap plate 20, respectively, to electrically insulate the connector parts 612 and 622 of the negative and positive electrode lead tabs 61 and 62 from the cap plate 20. In addition, each of the internal insulators 71 and 72 is brought into close contact with the cap plate 20 to one side while surrounding each of the connector parts 612 and 622 of the negative and positive electrode lead tabs 61 and 62, each of the rivet terminals 21a and 22a and each of the flanges 21b and 22b to the other side, thereby stabilizing connection structures thereof.

Meanwhile, the cap plate 20 includes a stepped portion 32 formed near the positive electrode terminal 22. The stepped portion 32 is integrally formed with the cap plate 20 and is shaped to upwardly protrude from the cap plate 20. In addition, the plate terminal 22c has a recessed groove formed at its bottom portion to be fitted into the stepped portion 32 of the cap plate 20 to then be fixed, the recessed groove having a size and a depth corresponding to the size and the depth of the stepped portion 32.

In addition, the cap plate 20 includes plate fixing protrusion parts 33 upwardly protruding at both sides of the stepped portion 32. The plate terminal 22c includes extension parts 34 horizontally protruding at bottom portions of its opposite ends, the extension parts 34 including grooves (not shown) corresponding to the fixing protrusion parts 33. Accordingly, when the plate terminal 22c is fixedly coupled to an upper portion of the stepped portion 32, the grooves of the extension parts 34 of the plate terminal 22c are engaged with the fixing protrusion parts 33, thereby firmly fixing the plate terminal 22c.

The external short-circuit portion 40 includes a membrane 43 sealing the short-circuit hole 42 formed in the cap plate 20 and inverted according to the internal pressure, and short-circuit tabs 44 electrically connected to the negative electrode terminal 21 and disposed at one side of the membrane 43 to be spaced apart from each other. The membrane 43 is welded to the short-circuit hole 42 to thus seal the short-circuit hole 42. The short-circuit tabs 44 are interposed between a negative electrode insulator 31 and the plate terminal 21c. When the secondary battery 100 normally operates, the short-circuit tabs 44 are maintained at a state in which they are spaced apart from the membrane 43.

The short-circuit tabs 44 may be made of, for example, nickel or stainless steel. Here, the membrane 43 may be made of the same as the cap plate 20, for example, aluminum.

Since the cap plate 20 is charged with a positive polarity, the short-circuit tabs 44 of the external short-circuit portion 40 and the rivet terminal 21a of the negative electrode terminal 21 are installed on the cap plate 20 with the negative electrode insulator 31 interposed therebetween. The negative electrode insulator 31 includes holes corresponding to the terminal hole H1 and the short-circuit hole 42 so as not to disturb installation of the rivet terminal 21a and inversion of the membrane 43.

Figure 3A:
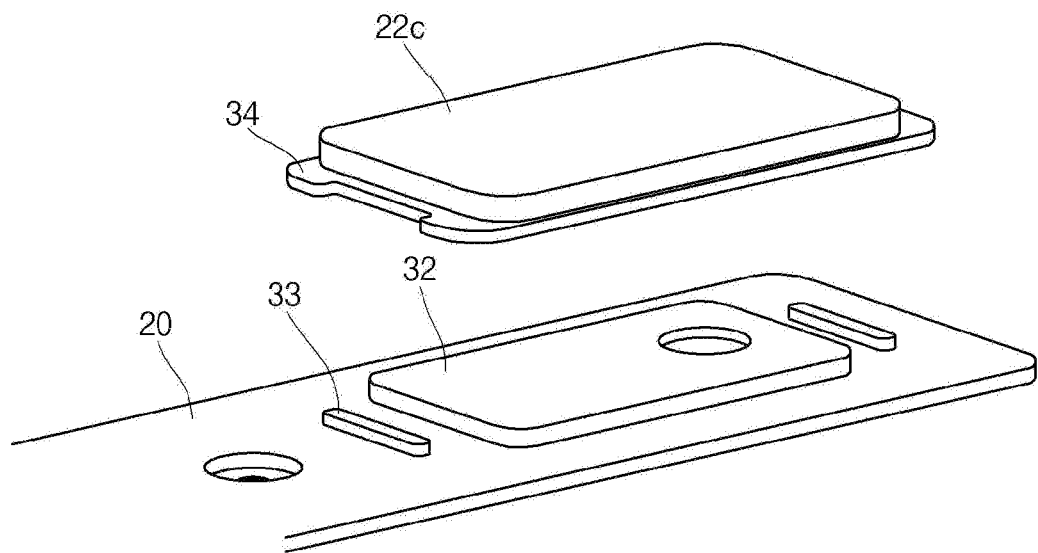
FIGS. 3A and 3B are a perspective view illustrating a stepped portion of a cap plate and a plate terminal according to an embodiment of the present invention and an assembled perspective view illustrating a state in which the cap plate is assembled with the plate terminal.
Figure 3B:
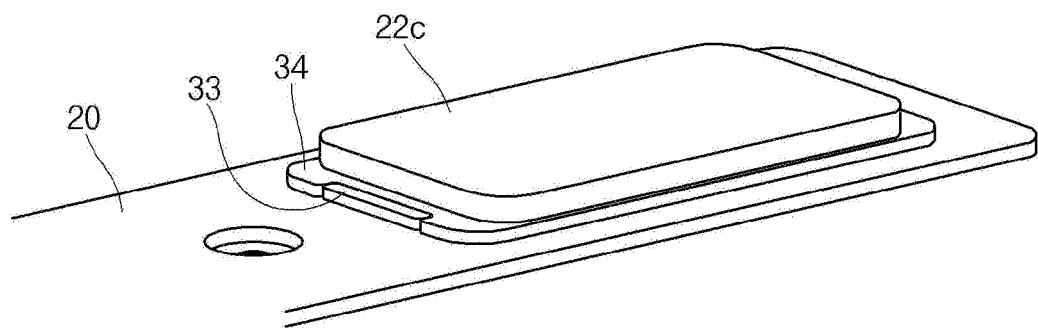
Figure 4:
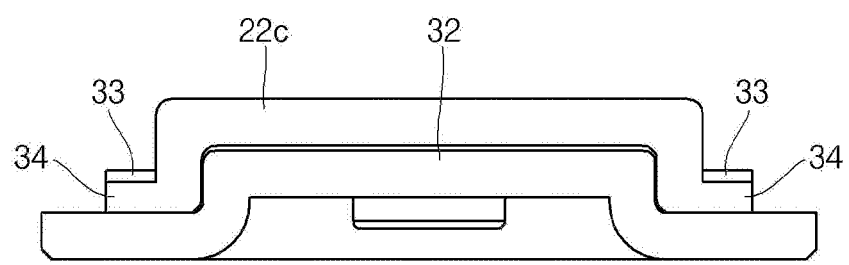
FIG. 4 is a cross-sectional view illustrating a stepped portion of a cap plate and a plate terminal according to an embodiment of the present invention.

FIGS. 3A and 3B are a perspective view illustrating a stepped portion of a cap plate and a plate terminal according to an embodiment of the present invention and an assembled perspective view illustrating a state in which the cap plate is assembled with the plate terminal. FIG. 4 is a cross-sectional view illustrating a stepped portion of a cap plate and a plate terminal according to an embodiment of the present invention.

Referring to FIGS. 3A, 3B and 4, the cap plate 20 according to the present invention includes at least one stepped portion 32 integrally formed with the cap plate 20 in an electrode terminal and upwardly protruding from the cap plate 20. The stepped portion 32 may be formed by attaching a metal having a predetermined height and made of the same material with the cap plate 20 near the electrode terminal. Alternatively, the stepped portion 32 is preferably formed to upwardly protrude so as to have a step having a predetermined height by rolling a region near the electrode terminal of the cap plate 20. The stepped portion 32 may function to support the plate terminal 22c when a load is horizontally applied to the plate terminal 22c after the plate terminal 22c is fixedly coupled to the cap plate 20. In addition, since the stepped portion 32 has an arbitrarily set height, the secondary battery according to the present invention can be designed such that the plate terminal 22c has an increased height, compared to the conventional secondary battery. The volume ratio can also be satisfied.

In the secondary battery 100 according to the embodiment of the present invention, the plate terminal 22c has a recessed groove formed in its lower portion, and the size and depth of the recessed groove preferably correspond to those of the stepped portion 32, as illustrated in FIG. 4.

In addition, the cap plate 20 includes plate terminal fixing protrusion parts 33 upwardly protruding to both sides of the stepped portion 32 near the electrode terminal. The protrusion parts 33 are elongated in a lengthwise direction of the stepped portion 32, that is, in a direction perpendicular to longer sides of the cap plate 20, as illustrated in FIG. 3A.

The plate terminal 22c further includes extension parts 34 horizontally protruding at bottom portions of its opposite ends. The bottom surfaces of the extension parts 34 are preferably parallel with the top surface of the cap plate 20. In addition, grooves are formed in the extension parts 34 so as to correspond to the fixing protrusion parts 33, respectively. The grooves of the extension parts 34 are fitted into the fixing protrusion parts 33 of the cap plate 20 to function to support the plate terminal 22c together with the stepped portion 32. In addition, the grooves of the extension parts 34 may be used as portions for being coupled by welding when the plate terminal 22c is welded to the cap plate 20 by laser welding.

While the fixing protrusion parts 33 having greater heights than the extension parts 34 are illustrated in FIG. 4, the protrusion parts 33 and the extension parts 34 are preferably formed to have the same height, as illustrated by the assembled perspective view of FIG. 3B.

In addition, opposite ends of the extension parts 34 of the plate terminal 22c are in the same positions with the opposite ends of the fixing protrusion parts 33.

Figure 5:
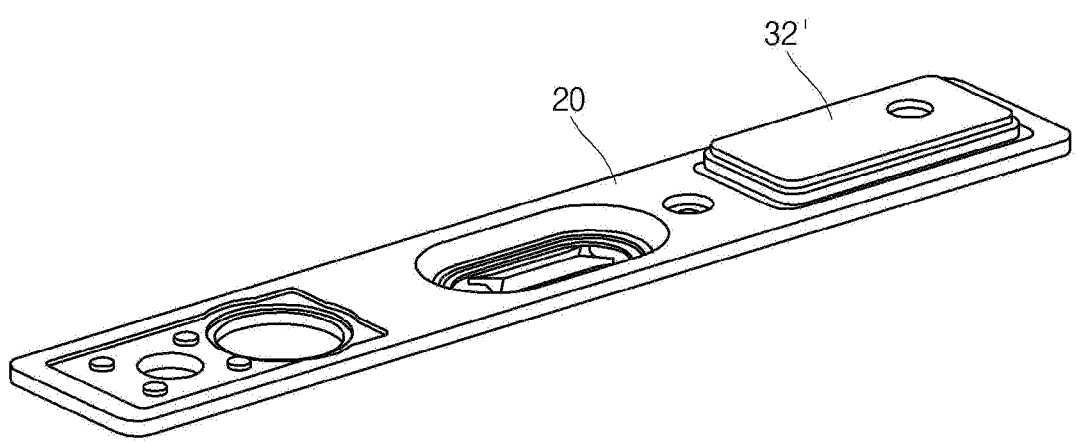
FIG. 5 is a perspective view of a cap plate according to another embodiment of the present invention.
Figure 6A:
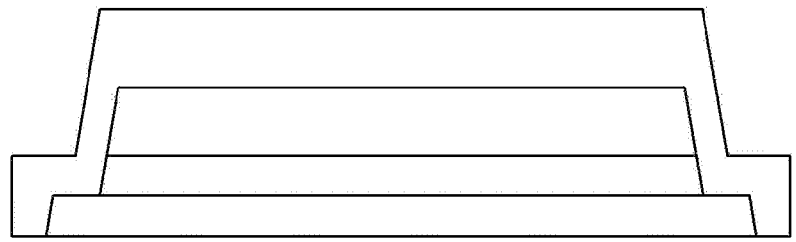
FIGS. 6A to 6C are cross-sectional view illustrating various types of stepped portions of the cap plate illustrated in FIG. 5.
Figure 6B:
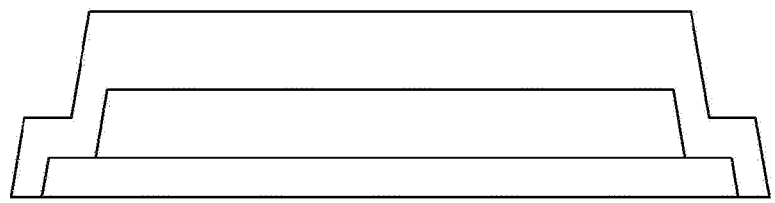
Figure 6C:
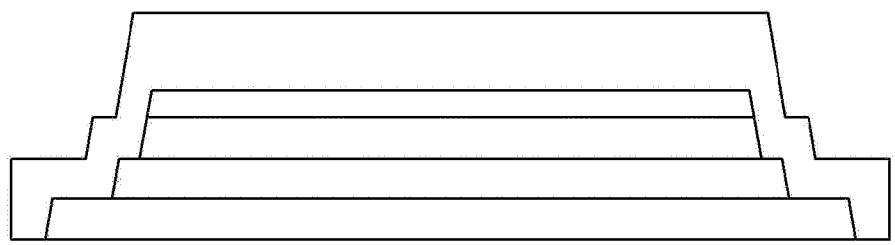
Figures 7, 8:
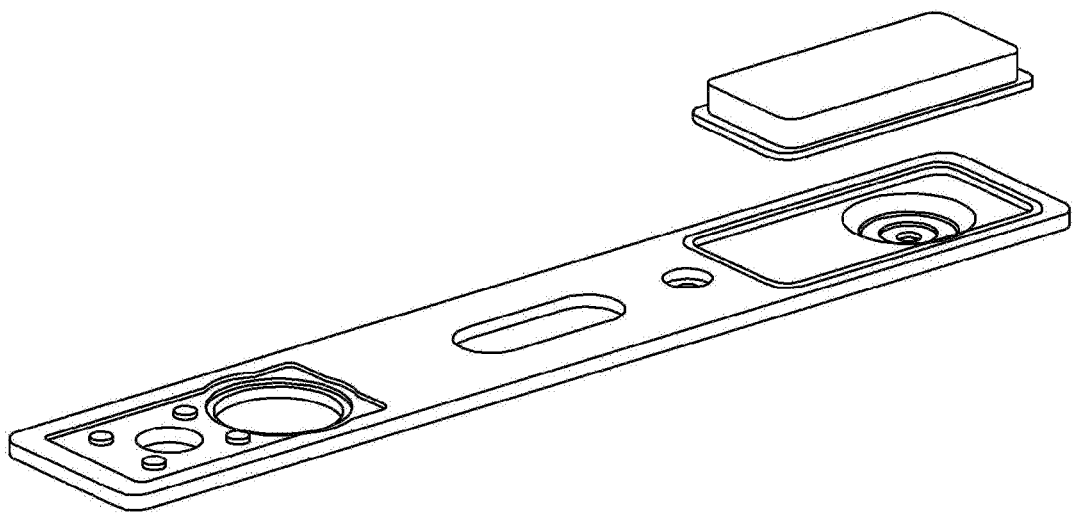
FIG. 7 is a perspective view of a general cap plate provided separately from a plate terminal.
FIG. 8 comparatively illustrates volume ratios depending on shapes of stepped portions illustrated in FIGS. 6A to 6C.

FIG. 5 is a perspective view of a cap plate according to another embodiment of the present invention. FIGS. 6A to 6C are cross-sectional view illustrating various types of stepped portions of the cap plate illustrated in FIG. 5. FIG. 7 is a perspective view of a general cap plate provided separately from a plate terminal.

Referring to FIG. 5, the cap plate 20 according to another embodiment of the present invention includes at least one stepped portion 32' integrally formed with the cap plate 20 at a region near an electrode terminal of an electrode assembly and upwardly protruding the cap plate 20. Meanwhile, the stepped portion 32' includes multiple steps and form a plate terminal 22c integrally formed with the cap plate 20. That is to say, unlike in the general cap plate separately provided from the plate terminal, as illustrated in FIG. 7, in the cap plate 20 according to another embodiment of the present invention, as illustrated in FIG. 5, the stepped portion 32' of the cap plate 20 may function as the plate terminal 22c.

Accordingly, the secondary battery according to another embodiment of the present invention can reduce the number of components for electrode terminals, e.g., a separate plate terminal, and assembling processes for the components are not required.

Referring to FIGS. 6A to 6C, according to other embodiments of the present invention, the stepped portion 32' may include one single step or may include multiple steps having a stepped shape.

FIGS. 6A and 6B illustrate the stepped portion 32' includes one single step, and FIG. 6C illustrates the stepped portion 32' includes two steps. In addition, the stepped portion 32' illustrated in FIGS. 6A and 6C has a height of 3.7 mm and the stepped portion 32' illustrated in FIG. 6B has a height of 3.0 mm.

Meanwhile, the stepped portion 32' illustrated in FIG. 6C includes steps having a stepped shape in which its widths gradually decrease away from a surface of the cap plate 20. In this case, the stepped portion 32' has the stepped shape by connecting multiple vertical parts and multiple horizontal parts.

The vertical parts may be formed in a direction perpendicular to a plane of the cap plate 20 but may also be formed to be inclined toward the center of the stepped portion 32' in the perpendicular direction. In addition, the stepped portion 32' may have a side face formed to have the same thickness with the cap plate 20, or to have a reduced thickness according to the manufacturing process.

The stepped portion 32' is formed by upwardly pressing an electrode terminal portion of the cap plate 20 through a forming process, such as rolling, which may be performed multiple times to increase the height of the stepped portion 32'. The height of the stepped portion 32' may be maximized by sequentially reducing rolled areas according to the sequence of the rolling. By performing the rolling multiple times in this way, the stepped portion 32' may be formed to have multiple steps having a stepped shape and may then function as a plate terminal.

FIG. 8 comparatively illustrates volume ratios depending on shapes of stepped portions illustrated in FIGS. 6A to 6C.

In order to enable a forming process in coning technology, a volume ratio before and after the forming process, should be at least 3% or greater. Referring to FIG. 8, when the stepped portion is formed to have one single step to a height of 3.7 mm, as illustrated in FIG. 6A, the volume before the forming process is 693 mm$^3$ and the volume after the forming process is also 693 mm$^3$, so that the volume ratio before and after the forming process is 0%. In this case, however, even if the stepped portion is formed to have a desired height, it is not possible to perform the forming process. In addition, as illustrated in FIG. 6B, when the stepped portion is formed to have one single step to a height of 3.0 mm, the volume before the forming process is 677 mm$^3$ and the volume after the forming process is 641 mm$^3$, so that the volume ratio before and after the forming process is 5%. In this case, there is a drawback in that even if the volume ratio is high enough to enable the forming process, the height of the stepped portion 32' cannot be increased to a desired height level. As illustrated in FIG. 6C, when the stepped portion is formed to have two steps to a height of 3.7 mm, the volume before the forming process is 764 mm$^3$ and the volume after the forming process is 736 mm$^3$, so that the volume ratio before and after the forming process is 4%. In this case, the plate terminal having a desired height can be formed by forming the stepped portion to a height of 3.7 mm, and the obtained volume ratio of 4% enables the forming process.

That is to say, in order to increase the height of the stepped portion to a desired height level while maintaining the volume ratio before and after a forming process to be as high as at least 3% enough to enable the forming process in coning technology, the stepped portion is preferably formed by performing the rolling multiple times to allow the stepped portion to have two or more steps, as illustrated in FIG. 6C.

When the conventional plate terminal is coupled to the cap plate by, for example, laser welding, it is necessary to form additional components including, e.g., a separate plate terminal, and assembling processes of the components are required.

In the secondary battery according to another embodiment of the present invention, however, the height of the stepped portion having multiple steps can be increased to a desired height level, making the stepped portion function as the plate terminal. Therefore, a separate plate terminal component or an assembling process thereof may not be required.

In addition, it is also possible to achieve a maximum height that enables a forming process using a mold with a limited volume in a single unit terminal forming process.

Although the foregoing embodiments have been described to practice the secondary of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

INDUSTRIAL APPLICABILITY

The secondary battery according to the present invention can be applied to portable small-sized electronic devices, such as cellular phones or camcorders, and to power sources for motor drives, such as those in electric bicycles, electric scooters, hybrid vehicles or electric vehicles.

The invention claimed is:
1. A secondary battery comprising:
an electrode assembly in which a separator is interposed in between a first electrode and a second electrode;
a case for accommodating the electrode assembly;

a cap plate for sealing an opening at an upper end of the case, wherein the cap plate has a bottom surface facing towards the electrode assembly when the cap plate is sealing the upper end of the case, and wherein a first terminal electrically connected to the first electrode of the electrode assembly is integrally formed with the cap plate; and a plate terminal arranged on a top surface of the cap plate opposite the bottom surface of the cap plate, wherein the cap plate is bent such that a portion of the cap plate is a stepped portion and a bottom surface of the stepped portion faces towards the electrode assembly and is farther from the electrode assembly than the bottom surface of the cap plate, wherein the stepped portion of the cap plate surrounds the first terminal such that the first terminal contacts an edge of the bottom surface of the stepped portion, wherein the cap plate is monolithic with the stepped portion, and the cap plate comprises protrusion parts for fixing the plate terminal upwardly protruding at both sides of the stepped portion; and wherein the plate terminal includes a groove on a bottom surface corresponding to the stepped portion of the cap plate and side grooves at both sides corresponding to the protrusion parts of the cap plate.

2. The secondary battery of claim 1, wherein the groove on the bottom surface of the plate terminal has a size and a depth corresponding to the size and the depth of the stepped portion.

3. The secondary battery of claim 1, wherein the plate terminal includes extension parts horizontally protruding at bottom portions of its opposite ends, the extension parts including the side grooves corresponding to the protrusion parts.

4. The secondary battery of claim 1, wherein the stepped portion includes one or more steps, and wherein the plate terminal and the cap plate are connected together in a single monolithic part.

5. The secondary battery of claim 4, wherein the stepped portion has a stepped shape in which its widths gradually decrease upward away from a surface of the cap plate.

6. The secondary battery of claim 5, wherein a side face of the stepped portion has a stepped shape by connecting multiple vertical parts and multiple horizontal parts.

7. The secondary battery of claim 6, wherein the vertical parts are inclined toward a center of the stepped portion in a direction perpendicular to a plane of the cap plate.

8. The secondary battery of claim 4, wherein a side face of the stepped portion has a uniform thickness.

9. The secondary battery of claim 1, wherein a ratio of a volume of an area of the cap plate corresponding to the stepped portion before the stepped portion is formed to a volume of the stepped portion is at least 3%.

\* \* \* \* \*